(12) United States Patent
Makowski et al.

(10) Patent No.: US 7,709,093 B2
(45) Date of Patent: May 4, 2010

(54) COATINGS WITH IMPROVED CHIP RESISTANCE AND METHODS OF MAKING THE SAME

(75) Inventors: Michael P. Makowski, Allison Park, PA (US); Jonathan T. Martz, Glenshaw, PA (US); Carolyn A. Novak, Gibsonia, PA (US); Christopher A. Verardi, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 660 days.

(21) Appl. No.: 10/982,074

(22) Filed: Nov. 5, 2004

(65) Prior Publication Data

US 2005/0123684 A1   Jun. 9, 2005

Related U.S. Application Data

(60) Provisional application No. 60/524,093, filed on Nov. 21, 2003.

(51) Int. Cl.
*B32B 27/40* (2006.01)
*C08G 18/00* (2006.01)

(52) U.S. Cl. ........................... 428/423.1; 528/44
(58) Field of Classification Search ............ 428/423.1; 528/44
See application file for complete search history.

(56) References Cited

U.S. PATENT DOCUMENTS

| | | | | |
|---|---|---|---|---|
| 4,190,566 | A | 2/1980 | Noll et al. | 260/29.2 TN |
| 4,794,147 | A | 12/1988 | Savino et al. | 525/440 |
| 5,017,673 | A * | 5/1991 | Balatan | 528/59 |
| 6,559,265 | B2 * | 5/2003 | Lamers et al. | 528/45 |

FOREIGN PATENT DOCUMENTS

| | | |
|---|---|---|
| EP | 0426883 A1 | 5/1991 |
| EP | 0601378 A1 | 6/1994 |
| EP | 0778326 A2 | 6/1997 |
| EP | 0889919 B1 | 1/1999 |
| JP | 02208379 | 8/1990 |
| JP | 11293150 | 10/1999 |
| JP | 2000017226 | 1/2000 |

\* cited by examiner

*Primary Examiner*—Thao T. Tran
(74) *Attorney, Agent, or Firm*—Robert A. Diaz

(57) ABSTRACT

A coating composition, formed of a film-forming component comprising a functional group-containing resinous binder and, optionally, a crosslinking agent having at least two functional groups that are reactive with the functional groups of the film-forming component, wherein, when the composition is applied and cured to form a cured coating, the cured coating is characterized as having a bicontinuous morphology. Methods of making the coating composition and coatings prepared therefrom are also provided. The coating composition can provide improved physical properties, such as chip resistance, when incorporated into a coating.

54 Claims, 2 Drawing Sheets

COATINGS WITH IMPROVED CHIP RESISTANCE AND METHODS OF MAKING THE SAME

CROSS REFERENCE

This application claims the benefit of U.S. Provisional Application No. 60/524,093 filed Nov. 21, 2003, incorporated herein by reference.

FIELD OF THE INVENTION

The present invention is directed to a coating composition, methods of forming the same, and coatings formed therefrom that have improved chip resistance.

BACKGROUND

Coating formulations find use in various industries including the coating and/or painting of motor vehicles. In these industries, and in the automotive industry in particular, considerable efforts have been expended to develop coating compositions with improved performance properties. In the automotive industry, for example, numerous approaches have been advanced to achieve improved chip resistance and corrosion protection. These efforts have included, for example, applying up to 6 or more individually applied coating layers over the substrate by one or more coating methods.

Such efforts have resulted in increased protection of the surface of the substrate and reduced paint loss through chipping when the substrate of the vehicle is hit with solid debris such as gravel and stones. For example, it has been found that reducing the difference in impact energy between multiple coating layers may improve the chip resistance of the overall coating system, especially for coatings in which the respective coating layers have excessive differences in hardness. It is believed that reducing the hardness differential can lessen delamination between the coating layers such as between the undercoat, an intermediate coat, and a top coat or an undercoat and an intermediate coat.

Significant time and effort have been expended to develop effective chip resistant coating system applications, such as through various coating formulations and/or intermediate coating layers that have been employed to increase the chip resistance in the finished product. It has also been a goal of automakers to develop more compact coating systems at assembly plants through the elimination of one or more coating layers, without adversely impacting chip resistant properties that, in many instances, is a competing interest in developing coating layers that provide good chip resistance. Elimination of coating layers provides time and cost benefits that are important to the efficiency of the overall coating process. The anti-chip primer layer, applied prior to the primer surfacer, is one coating layer that automakers have targeted for elimination. However, obtaining chip resistant properties of composite coating layers employing primer surfacer/basecoat/clearcoat or primer surfacer/monocoat systems over substrates that are difficult to coat, such as zinc coated metals, is difficult to achieve without the application of an antichip primer layer.

Accordingly, the need exists for a material that may be used in coating systems that may eliminate the need for certain coating layers, such as the antichip primer layer, while also providing chip resistant properties that are comparable to existing coating systems.

SUMMARY OF THE INVENTION

The present invention provides a coating composition, the coating composition formed from components comprising:
(a) a film-forming component comprising a functional group-containing resinous binder; and
(b) a crosslinking agent having at least two functional groups that are reactive with the functional groups of the film-forming component (a), wherein, when the composition is applied and cured to form a cured coating, the cured coating is characterized as having a bicontinuous morphology.

The present invention also provides a coating composition comprising a film-forming component comprising a functional group-containing resinous binder, wherein when the composition is applied and cured to form a cured coating, the cured coating is characterized as having a bicontinuous morphology.

The present invention also provides a coating composition comprising a polymeric portion dispersed in a carrier, the polymeric portion being formed from components comprising:
(a) a film-forming material comprised of a functional group-containing resinous binder formed from a polyurethane component and a water dispersible polymer component; and
(b) a crosslinking agent having at least two functional groups that are reactive with the functional groups in the film forming material (a), wherein, when the composition is applied and cured to form a cured coating, said coating is characterized as having a bicontinuous morphology.

In another embodiment, the present invention is directed to a coating composition comprising a polymeric portion dispersed in a carrier, the polymeric portion being formed from components comprising:
(a) a film-forming material comprised of a functional group-containing resinous binder formed from a polyurethane component and a water dispersible polymer component, wherein, when the composition is applied and cured to form a cured coating, the coating is characterized as having a bicontinuous morphology.

The present invention is also directed to a primer coating composition, a basecoat composition, a clearcoat composition, a monocoat composition, and a multilayer composite coating including any of the coating compositions described above. Where the present invention is a multilayer composite coating, at least one of the layers comprises the coating composition. In one embodiment, the present invention provides a multilayer composite coating comprising a primer coating deposited from a primer coating composition, and a topcoat applied over at least a portion of the primer coating wherein the topcoat is deposited from a topcoating composition, and wherein the primer coating composition comprises any of the coating compositions set forth above.

In another embodiment, the present invention provides a coated substrate having coated layers applied thereover, at least one of the layers comprising any of the coating compositions set forth above.

The present invention is also directed to a process for forming an aqueous coating composition comprising a polymeric portion dispersed in an aqueous medium, the process comprising:
(a) forming the polymeric portion from components comprising:

(i) a film-forming component comprising a functional group-containing resinous binder; and
(ii) a crosslinking agent having at least two functional groups that are reactive with the functional groups of the film-forming component (i), and
(b) dispersing the polymeric portion in water to form the aqueous composition,
wherein, when the composition is applied and cured to form a cured coating, the coating is characterized as having a bicontinuous morphology.

The present invention is also directed to a process for forming an aqueous coating composition comprising a polymeric portion dispersed in an aqueous medium, the process comprising:
(a) forming the polymeric portion from components comprising:
(i) a film-forming component comprising a functional group-containing resinous binder; and
(b) dispersing the polymeric portion in water to form the aqueous composition,
wherein, when the composition is applied and cured to form a cured coating, the coating is characterized as having a bicontinuous morphology.

The present invention is also directed to a process for preparing a coated substrate, comprising,
(a) forming a coating on at least a portion of the substrate, from a composition comprising a polymeric portion, the polymeric portion formed from components comprising:
(i) a film-forming material comprised of a functional group-containing resinous binder formed from a polyurethane component and a polyester-component; and
(ii) a crosslinking agent having at least two functional groups that are reactive with the functional groups in the film-forming material (i), and
(b) at least partially curing the coating,
wherein the coating is characterized as having a bicontinuous morphology.

It should be understood that this invention is not limited to the embodiments disclosed in this Summary, and it is intended to cover modifications that are within the spirit and scope of the invention, as defined by the claims.

DETAILED DESCRIPTION OF THE INVENTION

Figure 1:
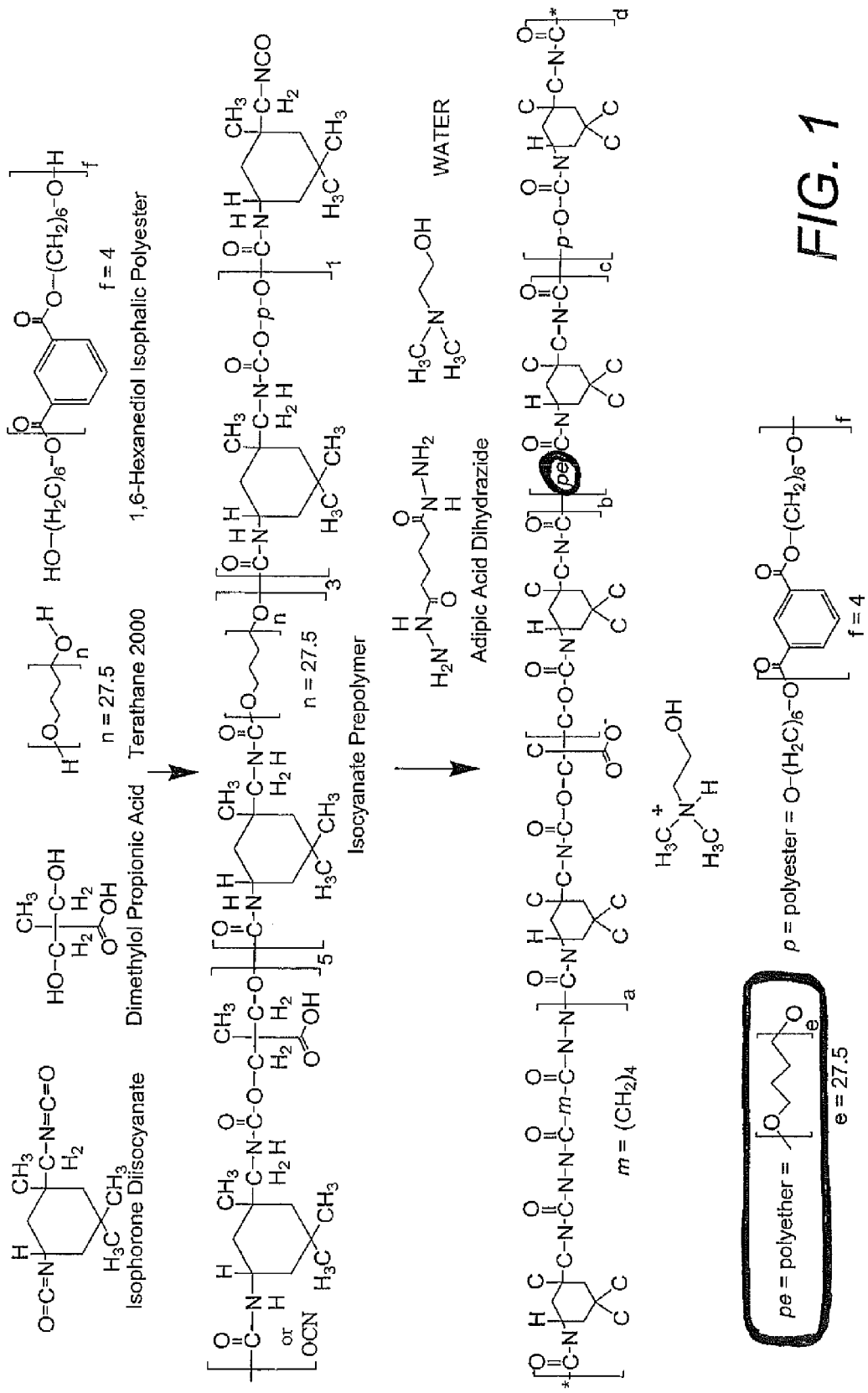
FIG. 1 is one embodiment of the synthesis of a coating composition of the present invention.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of urethane/urea groups to give the equivalent weight. For example, urethane/urea equivalent weight is based on the equivalents of urethane and urea groups in the polyurethane/urea material.

As used herein, the term "polymer" is meant to refer to oligomers and both homopolymers and copolymers. Also, as used herein, the term "polyurethane" is meant to include polyurethanes, polyureas, and mixtures thereof.

Also for molecular weights, whether Mn or Mw, these quantities are determined by gel permeation chromatography using polystyrene as standards as is well known to those skilled in the art and such as is discussed in U.S. Pat. No. 4,739,019 at column 4, lines 2-45, which is incorporated herein by reference in its entirety.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

As used herein "based on total weight of the resin solids" of the composition means that the amount of the component added during the formation of the composition is based upon the total weight of the resin solids (non-volatiles) of the film forming materials, polyurethanes, crosslinkers, and polymers present during the formation of the composition, but not including any water, solvent, or any additive solids such as hindered amine stabilizers, photoinitiators, pigments including extender pigments and fillers, flow modifiers, catalysts, and UV light absorbers.

As used herein, "formed from" denotes open, e.g., "comprising," claim language. As such, it is intended that a composition "formed from" a list of recited components be a composition comprising at least these recited components, and can further comprise other nonrecited components during the composition's formation.

As used herein, the term "cure" as used in connection with a composition, e.g., "a cured composition," shall mean that any crosslinkable components of the composition are at least partially crosslinked. In certain embodiments of the present invention, the crosslink density of the crosslinkable components, i.e., the degree of crosslinking, ranges from. 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

The average particle size can be measured according to known laser scattering techniques. For example, the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

As used herein, "thin film" refers to a film having a dry film thickness of less than 1000 microns, typically less than 800 microns, usually within the range of 10 to 700 microns, and more usually within the range of 25 to 600 microns. As used herein, the phrase "film-forming material" refers to a material that by itself or in combination with a coreactive material, such as a crosslinking agent, is capable of forming a continuous film on a surface of a substrate.

As used herein, the phrase "water dispersible" refers to the ability of a material (as finely divided particles) to be distributed throughout a sufficient number of polar groups (as a bulk substance) to form a two-phase system, wherein the material may be characterized as the disperse or internal phase and the polar groups may be characterized as the continuous or external phase. The resultant two-phase system may be ionic or non-ionic in character.

As used herein, "bicontinuous morphology" refers to two or more materials existing in separate phases, where the phases are uniformly intermingled within a film. A bicontinuous morphology is distinguished by two or more intermingled networks of ordinarily immiscible substances, in which macroscopic phase separation is prevented. In an embodiment of the present invention, macroscopic phase separation may be prevented by curing the present thermosetting composition, thus providing chemical linkages between the two components. In other words, the present bicontinuous morphology is a meta-stable thermodynamic state frozen in place by crosslinking.

As used herein, the terms "interaction parameter" and "X" refer to the dimensionless quantity that characterizes the interaction energy between a polymer molecule and a solvent or another polymer molecule (Flory, *Principles of Polymer Chemistry*, Cornell University Press (1953) pp. 507-511 and 541-545). The interaction parameter may be measured directly by small angle neutron scattering (Lohse, *Polymer Preprints*, 2001, 42(1), p. 259).

As used herein, the terms "solubility parameter" and "δ" refer to the Hildebrand solubility parameter or, as it may be referred to in polymeric systems, the cohesion parameter. Solubility parameters are determined for polymeric systems in a number of ways, non-limiting examples of which include the swelling behavior of polymers in a solvent, and cloud-point determinations in which a resin is dissolved in a true solvent and titrated with another solvent until the mixture becomes cloudy, thus identifying the range of solubility. Testing cloud-points with a variety of solvents and diluents enable a precise determination of cohesion parameter values for polymers. Other methods include, but are not limited to, a combination of empirical tests, such as cloud-point and solubility/swelling tests, with the addition of theoretical calculations based on comparing chemical structure to other materials of known solubility parameter values. The solubility parameter is typically expressed in the square root of Joules per cubic centimeter $((J/cm^3)^{1/2})$.

As used herein, "CHIP TEST METHOD" refers to test procedures for determining chip resistance rating of multi-layer composite coatings based upon test KAG-P-00065, published by Nissan Motor Co., Ltd., using 5 mm diameter brass nuts at −20° C., which is incorporated by reference herein in its entirety.

The present invention is directed to a coating composition, coatings prepared therefrom, and methods of making the same. The coating composition may be a thermosetting composition or a thermoplastic composition. In an embodiment of the present invention the coating composition comprises a thermosetting composition comprising a film-forming component comprising a functional group-containing resinous binder and, optionally, a crosslinking agent having at least two functional groups that are reactive with the functional groups of the film-forming component. The film-forming component may include a polyurethane component and a water dispersible polymer component. The thermosetting coating composition may include a crosslinking agent or may be capable of self-crosslinking, i.e., it contains reactive groups that are capable of reacting with each other to form a crosslinked network. For example, in one embodiment of the present invention, an isocyanate group and a hydroxyl group are capable of reacting with each other to form a crosslinked network. When the coating composition is applied and cured to form the cured coating, the cured coating is characterized as having a bicontinuous morphology.

In the present invention, the solubility parameter of the film-forming components is sufficiently different such that the resulting thermodynamic interaction parameter value ($\chi$) for the admixture of the components that form the film-forming material, such as the polyurethane component and the water dispersible polymer component, is typically 0.5 or greater. This can result, although not necessarily, because the components that form the film-forming material are immiscible with each other and form a bicontinuous morphology in which macroscopic phase separation is prevented by curing the thermosetting composition.

More specifically, the "free energy of mixing" is defined as $\Delta G = \Delta H - T\Delta S$, where G is the Gibb's free energy, H is enthalpy, S is entropy, and T is temperature. Simply put, when the free energy of mixing ($\Delta G$) of two components is a positive value, the two components are immiscible and will phase separate, for example, in the instance where a coating composition contains two substantially immiscible components, when applied as a coating layer the components separate into their distinct phases and form a bicontinuous morphology in the bulk. Also, ΔG for a binary mixture containing a component 1 and a component 2 may be defined by the following equation:

$$\Delta G = RT[(n_1 \ln X_1 + n_2 \ln X_2) + \chi n_1 X_2]$$

where R is the gas constant, T is temperature, X is the volume fraction of component 1 or 2, n is the number of particles, and χ ("chi") represents the thermodynamic interaction parameter as indicated above. The thermodynamic interaction parameter (χ or "chi") is defined as the difference in the energy of mixing of components 1 and 2. This can be represented by the following equation:

$$\chi = (\Delta E_{mix}/RT)V_m$$

where $V_m$ is the average molar volume ("reference segment volume") and R and T are defined above. "Chi" may also be defined as the difference in solubility parameter (δ) of two materials as follows:

$$\chi = V_m(\delta_1 - \delta_2)^2/RT$$

where δ is the Hildebrand solubility parameter. The solubility parameter may be computed from a value known as the cohesive energy density ("ced") of a material. The "ced" is related to the heat of vaporization of a material, that is, how much energy is required to remove a single molecule from the bulk. For polymeric systems, such as a coating composition, where the assumption that the entropy of mixing is exceedingly small, the free energy expressions reduce to the energy of mixing itself, that is ΔG=ΔH, and a theoretical critical point exists where two materials become immiscible (phase separate) when "chi" is greater than 0.5. For regular solutions (i.e., of low molecular weight species), this critical point has a value of 2.0.

To summarize, from first principles, the "ced" for a bulk material can be computed. The "ced" is directly related to the solubility parameter (δ) as indicated above. The thermodynamic interaction parameter "chi" (χ) can be computed from the differences in the solubility parameter (δ) for each of the two materials. "Chi," along with relative fractions of materials in a mixture, may be used to compute the free energy of mixing (ΔG). If ΔG is a positive value, the mixture is thermodynamically unstable and phase separation will occur. Critical points for this condition are values of "chi" equal to 0.5 and greater for higher molecular weight materials, such as the polymeric components of a resinous binder system, and 2.0 for smaller molecules. Thus, the formation of a bicontinuous morphology results from balancing the solubility parameter (δ), the thermodynamic interaction parameter (χ), the volume fraction of each component (Φ), and the molecular weight of each component. (Flory, Paul J., *Principles of Polymer Chemistry*, Cornell University Press (1953), Chapters XII and XIII; *Polymer User Guide*, September 1996, Molecular Simulations, Inc., San Diego, Calif.; Nicolaides, D., *Parameterisation for Mesoscale Modeling*, Molecular Simulations, Inc.).

As mentioned above, in one embodiment the components that may comprise the film-forming material, such as the polyurethane component and the water dispersible polymer component, may form two phases resulting in the formation of a bicontinuous morphology that is "locked" in place when the thermosetting composition is cured. The resultant coating can exhibit improved gloss and reduced haze relative to prior art coatings, as well as improved flexibility and chip resistance.

In the present invention, typically the thermodynamic interaction parameter "chi" (χ) of the components that form the film-forming material, such as the polyurethane component and the water dispersible polymer component, is at least 0.5. Additionally, in the present invention, typically the difference between the solubility parameter, $\delta_a$, of the polyurethane component and the solubility parameter, $\delta_b$, of the water dispersible polymer component $(\delta_a - \delta_b)$ is at least 1, typically at least 1.5, in some embodiments is in the range of 1.5 and 2, and may be at least 2.

Generally, the components that form the film-forming material, such as the polyurethane component and the water dispersible polymer component, will be present in the thermosetting composition at a level that will result in the formation of a bicontinuous morphology.

The film-forming component may comprise a functional group-containing resinous binder comprising at least one of a polyurethane component, a water dispersible polymer component, such as a polyester component, mixtures thereof, and copolymers thereof. Each of the polyurethane component and the water dispersible polymer component may be included either alone, or in combination, to form the film-forming component. The polydispersity index (PDI) of the film-forming component is not always critical. The polydispersity index of the film-forming component is usually less than 10, in many cases less than 8, and, in some cases, is less than 6. As used herein and in the claims, "polydispersity index" is determined from the following equation: (weight average molecular weight (Mw)/number average molecular weight (Mn)).

The polyurethane component may be present in the coating composition in an amount ranging from 5 to 40 percent, or in an amount ranging from 5 to 30 percent, or in an amount ranging from 10 to 25 percent by weight based on the total weight of the coating composition.

The polyurethane component may be formed from any number of polyisocyanates. As used herein the term "polyisocyanate" includes both blocked and unblocked polyisocyanates.

Suitable polyisocyanates used for preparing the polyurethane component can include aliphatic, cycloaliphatic, araliphatic, and aromatic isocyanates, and mixtures thereof. Typically, the polyisocyanate is aliphatic or cycloaliphatic.

Examples of useful aliphatic and cycloaliphatic polyisocyanates include 4,4-methylenebisdicyclohexyl diisocyanate (hydrogenated MDI), hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), and cyclohexylene diisocyanate (hydrogenated XDI). Other aliphatic polyisocyanates include isocyanurates of IPDI and HDI.

Examples of suitable aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI) and phenylene diisocyanate.

Polyisocyanate derivatives prepared from hexamethylene diisocyanate, 1-isocyanato-3,3,5-trimethyl-5-isocyanatomethylcyclohexane ("IPDI"), including isocyanurates thereof, and/or 4,4'-bis(isocyanatocyclohexyl)methane are suitable.

The amount of polyisocyanate used to prepare the polyurethane component generally ranges from 15 to 50 percent by weight, and may range from 20 to 35 percent by weight based on total weight of the resin solids used to prepare the polyurethane component.

The components from which the polyurethane component is formed may comprise at least one acid functional material or anhydride having at least one functional group reactive with the isocyanate or hydroxyl groups of other components from which the polyurethane component is formed. Useful acid functional materials include compounds and polymers having the structure:

X—Y-Z wherein X is OH, SH, NH$_2$, or NHR, and R includes alkyl, aryl, cycloalkyl, substituted alkyl, substituted aryl, and substituted cycloalkyl groups, and mixtures thereof; Y includes alkyl, aryl, cycloalkyl, substituted alkyl, substituted aryl, and substituted cycloalkyl groups, and mixtures thereof; and Z includes OSO$_3$H, COOH, OPO$_3$H$_2$, SO$_2$OH, POOH, and PO$_3$H$_2$, and mixtures thereof.

Examples of suitable acid functional materials include, but are not limited to, dimethylolpropionic acid (DMPA), hydroxypivalic acid, 3-hydroxy butyric acid, D,L-tropic acid, D,L hydroxy malonic acid, D,L-malic acid, citric acid, throglycolic acid, glycolic acid, amino acid, 12-hydroxy stearic acid, mercapto propionic acid, mercapto butyric acid, mercapto-succinic acid, and mixtures thereof. Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyurethane. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, trimellitic anhydride, chlorendic anhydride, itaconic anhydride, citraconic anhydride, maleic anhydride, and mixtures thereof.

The acid functional material or anhydride provides the polyurethane component with anionic ionizable groups that can be ionized for solubilizing the polymer in water. For the purposes of this invention, the term "ionizable" means a group capable of becoming ionic, i.e., capable of dissociating into ions or becoming electrically charged. The acid is neutralized with base to from a carboxylate salt group. Examples of anionic groups include —OSO$_3^-$, —COO$^-$, —OPO$_3^=$, —SO$_2$O$^-$, —POO$^-$; and PO$_3^=$, with COO$^-$ being preferred.

The amount of acid functional material or anhydride that is used to prepare the polyurethane component is at least 1 percent, typically ranging from at least 1 to 20 percent, and in some embodiments ranging from 6 to 10 percent by weight based on total weight of the resin solids used to form the polyurethane component.

The acid groups may be neutralized with a base. Neutralization can range from 0.1 to 2.0, and may range from 0.4 to 1.3, of the total theoretical neutralization equivalent. Suitable neutralizing agents include inorganic and organic bases such as sodium hydroxide, potassium hydroxide, ammonia, amines, alcohol amines having at least one primary, secondary, or tertiary amino group and at least one hydroxyl group. Suitable amines include alkanolamines such as monoethanolamine, diethanolamine, dimethylaminoethanol, diisopropanolamine, and the like. The appropriate amount of the neutralizing agent may be 0.1 to 1.0 times, and may be 0.4 to 1.0 times the total theoretical neutralization equivalent.

The components from which the polyurethane component is formed may, optionally, comprise at least one active hydrogen-containing material different from those previously described. The term "active hydrogen" means those groups that are reactive with isocyanates as determined by the Zerewitnoff test as is described in the JOURNAL OF THE AMERICAN CHEMICAL SOCIETY, Vol. 49, page 3181 (1927). The active hydrogens may include those derived from polyols and/or amines. Nonlimiting examples of suitable active hydrogen-containing materials comprise polyols, polyethers, polyesters, polycarbonates, polyamides, polyurethanes, polyureas, and mixtures thereof. Typically, the active hydrogen-containing material does not include acid functional groups.

In one embodiment of the present invention, the active hydrogen-containing material may comprise one or more low molecular weight polyols such as those having two to four hydroxyl groups. The weight average molecular weight of the low molecular weight polyol can be in the range of 600 to 3,000 grams per mole, in some embodiments can be in the range of 800 to 2,500 grams per mole, and may be in the range of 1,000 to 2,000 grams per mole. Examples of suitable low molecular weight polyols include diols, triols, and tetraols having 1 to 10 carbon atoms such as, for example, ethylene glycol, 1,2-propylene glycol, 1,4-butanediol, 1,6-hexanediol, trimethylolpropane, ditrimethylolpropane, trimethylolethane, glycerol, pentaerythritol and sorbitol. Examples of other low molecular weight polyols include ether polyols such as diethylene glycol, ethoxylated bisphenol A, and alkoxylated bisphenol A.

Other examples of polyether polyols include polyalkylene ether (poly(oxyalkylene)) polyols which include those having the following structural formula:

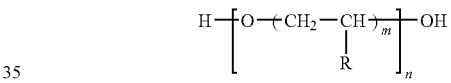

wherein the substituent R is hydrogen or lower alkyl containing from 1 to 5 carbon atoms including mixed substituents, m is an integer from 1 to 4, preferably 1 or 2, and n is an integer typically ranging from 5 to 200. Useful polyether polyols include poly(oxytetramethylene) glycols, such as TERATHANE® 650, commercially available from E. I. du Pont de Nemours and Company, LaPorte, Tex., poly(oxyethylene) glycols, poly(oxy-1,2-propylene) glycols and the reaction products of ethylene glycol with a mixture of 1,2-propylene oxide and ethylene oxide. These materials are obtained by the polymerization of alkylene oxides such as ethylene oxide, propylene oxide and tetrahydrofuran. TERATHANE® 1000 and 2000 may also be employed.

Also, polyethers obtained from the oxyalkylation of various polyols, for example, diols such as 1,6-hexanediol or higher polyols such as trimethylolpropane and sorbitol can be used. One commonly utilized oxyalkylation method is the reaction of a polyol with alkylene oxide, such as ethylene or propylene oxide, in the presence of an acidic or basic catalyst in a manner well known to those skilled in the art.

Examples of other suitable active hydrogen-containing polyethers are polymeric polyamines such as polyether polyamines for example, polyoxyalkylene polyamines. In the practice of the invention, where the expression "polyoxyalkylene polyamines" is used, what is intended are those polyamines containing both oxyalkylene groups and at least two amine groups, typically primary amine groups, per molecule.

An example of a particularly useful polyoxyalkylene polyamine is represented by the following structural formula:

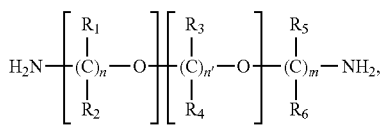

wherein m can range from 0 to 50, n can range from 1 to 50, n' can range from 1 to 50, x can range from 1 to 50, y can range from 0 to 50 and $R_1$ through $R_6$ can be the same or different and can be independently selected from the group consisting of hydrogen or lower alkyl radicals preferably having 1 to 6 carbon atoms.

Another example of a useful polyoxyalkylene polyamine are those of the structure:

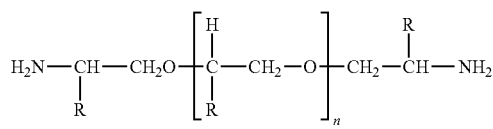

wherein R can be the same or different and is selected from hydrogen, lower alkyl radicals having from 1 to 6 carbon atoms, and n represents an integer ranging from 1 to 50, and may be 1 to 35. Non-limiting examples of preferred polyoxyalkylene polyamines include polyoxypropylene diamines such as Jeffamine® D-2000 and Jeffamine® D-400, commercially available from Huntsman Corporation, Houston, Tex. A number of such other polyoxyalkylene polyamines are described in more detail in U.S. Pat. No. 3,236,895, column 2, lines 40-72; methods of preparation of the polyoxyalkylene polyamines are illustrated in the patent in Examples 4, 5, 6 and 8-12 in columns 4 to 9 thereof; the aforementioned portions of U.S. Pat. No. 3,236,895 hereby being incorporated by reference.

Mixed polyoxyalkylene polyamines can be used, that is, those in which the oxyalkylene group can be selected from more than one moiety. Examples include mixed polyoxyethylene-propylenepolyamines such as those having the following structural formula:

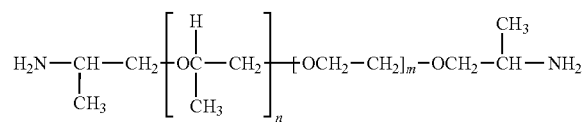

wherein m is an integer ranging from 1 to 49, and may be 1 to 34, and n is an integer ranging from 1 to 34 and where the sum of n+m is equal to 1 to 50, and may be 1 to 35.

Besides the polyoxyalkylenepolyamines mentioned above, derivatives of polyoxyalkylenepolyols may also be used. Examples of suitable derivatives would be aminoalkylene derivatives which are prepared by reacting polyoxyalkylenepolyols such as those mentioned above with acrylonitrile followed by hydrogenation of the reaction product in a manner well known to those skilled in the art. An example of a suitable derivative would be polytetramethylene glycol bis(3-aminopropyl(ether)). Other suitable derivatives would have the following structural formula:

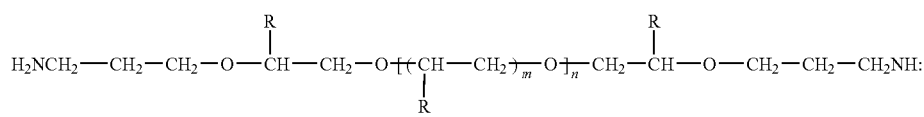

wherein the substituent R is hydrogen or lower alkyl containing from 1 to 5 carbon atoms including mixed substituents, m is an integer from 1 to 4, preferably 1 or 2, and n is an integer typically ranging from 5 to 200.

For mixed oxyethylene-propylene groups in the polyether segment, it is preferred that the oxypropylene content be at least 60 weight percent, more preferably at least 70 weight percent, more preferably at least 80 weight percent based on total weight of the resin solids.

The polyether segment can be derived from a single type of polyether polyol or polyamine or various mixtures thereof.

Other suitable polyols include polycarbonate diols, polyester diols, hydroxyl-containing polydiene polymers, hydroxyl-containing acrylic polymers, and mixtures thereof.

Examples of polyester polyols and hydroxyl containing acrylic polymers are described in U.S. Pat. Nos. 3,962,522 and 4,034,017, respectively, which are incorporated herein by reference. Examples of polycarbonate polyols are described in U.S. Pat. No. 4,692,383 in col. 1, line 58 to col. 4, line 14, which is incorporated herein by reference. Examples of hydroxyl-containing polydiene polymers are disclosed in U.S. Pat. No. 5,863,646, col. 2, lines 11-54, which is incorporated herein by reference. These polymeric polyols generally can have a weight average molecular weight ranging from 400 to 10,000 grams per mole.

Generally, the amount of active hydrogen-containing material that is used to prepare the polyurethane can be up to 70 weight percent, and may be in the range of 10 to 25 percent by weight based on total weight of the resin solids used to make the polyurethane component. In one embodiment of the present invention, the active hydrogen-containing material may include a polyether polyol segment and a polyester polyol segment, such as those set forth above, with each polyester polyol and polyether polyol segment being present in the polyurethane component in amounts of up to 70 weight percent, and, in some embodiments, in the range of 30 to 70 percent by weight based on total weight of the resin solids used to prepare the polyurethane component.

In one embodiment of the present invention, and as set forth in FIG. 1, the coating composition includes an active hydrogen-containing material and a polyester component. In this embodiment, the active hydrogen-containing material is TERATHANE® 2000 and the polyester component is 1,6 hexanediol isophthalic polyester.

The polyisocyanate(s) and active hydrogen-containing material(s) may be added with some or all of the components that form the polyurethane of the present invention, or can be prereacted together in a manner well known to those skilled in the art to form a prepolymer prior to reaction with the other components used to prepare the polyurethane component. For example, the polyisocyanate(s) and active hydrogen-containing material(s) may be prereacted at between 40-90° C. using up to 0.5%, and in some embodiments 0.04%, dibutyl tin dilaurate. Generally, the ratio of isocyanate equivalents to active hydrogen equivalents ranges from 10:1 to 1.1:1, may range from 5:1 to 1.1:1, and in some embodiments may range from 1.5 to 1.1:1.

The polyurethane component, described above, may further include a chain extender, such as for example, a polyamine. Useful polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-propylene diamine, 1,8-octane diamine, isophorone diamine, propane-2,2-cyclohexyl amine, adipic acid dihydrazide, 2-amino ethyl ethanolamine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

Based upon the total weight of resin solids from which the polyurethane component is formed, the amount of polyamine can range from 1 to 8 weight percent, and in some embodiments can range from 2.5 to 5 weight percent.

The polyurethane component can further comprise one or more blocking agents for blocking at least a portion of the isocyanate functional groups of the polyurethane component.

Examples of suitable blocking agents used to form the polyurethane components can include: oximes, such as acetoxime, methyl ethyl ketoxime, acetophenone oxime, cyclohexanone oxime, and methyl isobutyl ketoxime; carbon-hydrogen acid compounds, such as dialkyl malonate, alkyl acetoacetate, and acetylacetone; heterocyclic compounds, such as furfuryl alcohol, 1,2,4-triazole, and 3,5-dimethylpyrazole; lactams such as epsilon-caprolactam; amides, such as methyl acetamide, succimide, and acetanilide; phenols, such as methyl-3-hydroxy-benzoate and methyl-4-hydroxy-benzoate; and amino compounds, such as diisopropylamine, dicyclohexylamine, di-tert-butylamine, piperidine, and 2,2,6,6-tetramethylpiperidine.

The amount of blocking agent that may be used to prepare the polyurethane component may be up to 10 percent, or may range from 1.0 to 5.0 percent by weight based on total weight of the resin solids used to form the polyurethane component.

The polyurethane component may be formed by combining the above-identified components in any suitable arrangement or proportions known to one of ordinary skill in the art. For example, in preparing the reaction products of the present invention, the components may be combined in a single batch step or, as illustrated below, as a sequence of steps. For example, the polyisocyanate and the active hydrogen-containing material may be prereacted under suitable conditions to form a prepolymer prior to reaction with one or more of the remaining components. Any suitable reaction temperatures may be used to form the prepolymer such as, for example, those reaction temperatures that range from 50° C. to 180° C. A blocking agent may be reacted therein for blocking at least a portion of isocyanate groups of the prepolymer. Such a reaction may be performed at any suitable reaction temperature, such as, for example, 60° C. to 90° C. Thereafter, the polyamine material may be added under any suitable conditions, such as, for example at a reaction temperature of 70° C. to 75° C. Then, the acid functional material or anhydride having at least one functional group reactive with isocyanate or hydroxyl groups may be reacted therein to form the polyurethane component, under suitable conditions, such as, for example, at a reaction temperature of 60° C. to 95° C.

The polyurethane component can be nonionic or anionic. The weight average molecular weight of the polyurethane component is typically in range of 10,000 to 100,000 grams per mole, in some embodiments is in the range of 30,000 to 90,000 grams per mole, and may be between 40,000 and 60,000 grams per mole. The molecular weight of the polyurethane and other polymeric materials used in the practice of the invention is determined by gel permeation chromatography using a polystyrene standard.

The polyurethane component is useful for forming powder, liquid, and powder slurry compositions. The polyurethane component may be present in an aqueous composition.

The polyurethane component of the present invention may be present in a composition in the form of an aqueous dispersion. As used herein the term "dispersion" is meant to refer to a two-phase transparent, translucent or opaque resinous system in which the resin is in the dispersed phase and the water is the continuous phase. The average particle size of the resinous phase is generally less than 1.0 micron, can be less than 0.5 microns, and in some embodiments can be less than 0.2 microns.

Generally, the concentration of the resinous phase in the aqueous medium ranges from 10 to 60 percent, can range from 30 to 55 percent, and in some embodiments can range from 35 to 45 percent by weight based on total weight of the aqueous dispersion.

The film-forming component may further include an active hydrogen-containing water dispersible polymer component either alone or in addition to the polyurethane component discussed above. Any water dispersible polymer component may be employed in the film-forming component of the present invention such as, for example, alkyd-containing polymers, polyester-containing polymers, acrylic polymers, olefinic polymers, polyurethane-containing polymers, copolymers thereof, and mixtures thereof. The water dispersible polymer component of the film-forming component can include components that are the same or different from the polyesters used to prepare the polyurethane component. As used herein, with respect to components, "different" means that the respective components do not have the same chemical structure.

In one embodiment of the present invention, the water dispersible polymer component is a waterborne, acrylic-modified alkyd emulsion that includes oxidizing or non-oxidizing oil free alkyd resins, urethane, vinyl, epoxy modified alkyd, thixotropic resins, and mixtures thereof, for example, a Resydrol®-based polymer, commercially available as composition VAZ 6600w/36WA from UCB Surface Specialties, Smyrna, Ga.

In addition to those polymers set forth above, the water dispersible polymer component of the film-forming component may include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids, such as anhydrides where they exist or lower alkyl esters of the acids, such as the methyl esters can be used. Also, small amounts of monocarboxylic acids, such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid, such as hyexhydrophthalic anhydride with a diol, such as neopentyl glycol in a 1:2 molar ratio. Where it is desired to enhance air-drying, suitable drying oil fatty acids may be used and include those derived from linseed oil, soy bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters is described in U.S. Pat. No. 5,593,733 at column 2, line 40 to column 4, line 9, incorporated herein by reference.

The water dispersible polymer component may be present in the coating composition in an amount ranging up to 80 percent, can be in an amount ranging from 30 to 80 percent, and in some embodiments can be in an amount ranging from 50 to 70 percent by weight based on the total weight of the coating composition. The weight average molecular weight of the water dispersible polymer component is typically in range of 2,000 to 20,000 grams per mole, in some embodiments is in the range of 4,000 to 12,000 grams per mole.

To achieve optimum chip resistance and durability, the film forming component may be curable or thermosettable as mentioned previously. The film-forming material may be self-crosslinking, although external crosslinking agents such as isocyanates blocked with oximes, such as methyl ethyl ketoxime, aminoplasts, and mixtures thereof can be used. Other useful external crosslinking agents include polyisocyanates such as those described above. The polydispersity index (PDI) of the polymer of the crosslinking agent is not always critical. The polydispersity index can be less than 2, and can be less than 1.5.

The polyisocyanate may be fully capped with essentially no free isocyanate groups and present as a separate component or it may be partially capped and reacted with hydroxyl or amine groups in the polyurethane backbone. Examples of suitable polyisocyanates and capping agents are those described in U.S. Pat. No. 3,947,339, which is incorporated herein by reference in its entirety.

When the crosslinking agent contains free isocyanate groups, the film-forming composition may be a two-package composition (one package comprising the crosslinking agent and the other comprising the hydroxyl functional polymer and other ingredients). The two packages may be blended immediately prior to application. Fully capped polyisocyanates are described in U.S. Pat. No. 3,984,299, which is incorporated herein by reference in its entirety.

The polyisocyanate can be an aliphatic, cycloaliphatic or an aromatic polyisocyanate or a mixture thereof. Diisocyanates are typical, although higher polyisocyanates can be used in place of or in combination with diisocyanates. Aliphatic or cycloaliphatic polyisocyanates are typical.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4', 4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate, and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include those blocking agents set forth hereinabove, oximes such as methyl ethyl ketoxime (preferred), acetone oxime and cyclohexanone oxime, lactams such as epsilon-caprolactam, and amines such as dibutyl amine.

When present, the crosslinking agent may be present in the coating compositions of the present invention in an amount of at least 10 percent by weight, is typically in the range of 10 to 40 percent by weight, and in some embodiments is in the range of 14 to 30 percent by weight based on total resin solids weight of the coating composition.

Aminoplast resins are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product that is useful in powder coatings. While the aldehyde used is most often formaldehyde, other aldehydes such as acetaldehyde, crotonaldehyde, and benzaldehyde may be used.

The aminoplast resin may contain methylol groups and typically at least a portion of these groups is etherified with an alcohol to modify the cure response. Any monohydric alcohol may be employed for this purpose including methanol, ethanol, butanol, isobutanol, and hexanol.

Suitable aminoplast resins include melamine-, urea-, glycouril or benzoguanamine-formaldehyde condensates etherified with an alcohol containing from one to four carbon atoms.

The aminoplast resin can be present in the composition in amounts ranging from 5 to 60 percent by weight, and in some embodiments can be present in an amount ranging from 15 to 50 percent by weight based on the total weight of resin solids.

The coating composition may also contain catalysts to accelerate the cure of the crosslinking agent with reactive groups of the polymer(s). Suitable catalysts for aminoplast cure include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. The catalyst can be present in an amount ranging from 0.05 to 5.0 percent by weight, or from 0.08 to 2.0 percent by weight, based on the total weight of resin solids in the thermosetting composition.

Other ingredients such as pigments and fillers can be present in the coating composition. Useful pigments include hiding pigments such as titanium dioxide, zinc oxide, antimony oxide, etc. and organic or inorganic UV opacifying pigments such as iron oxide, transparent red or yellow iron oxide, carbon black, phthalocyanine blue, and the like. Useful fillers include barium sulfate, magnesium silicate, calcium carbonate, and silica. Fillers and pigments can be present in amounts of up to 60 parts by weight or less based on 100 parts by weight of total solids of the coating composition.

Other optional ingredients can include anti-oxidants, UV-absorbers and hindered amine light stabilizers, such as for example, hindered phenols, benzophenones, benzotriazoles, triazoles, triazines, benzoates, piperidinyl compounds and mixtures thereof. These ingredients are typically added in amounts up to 2 percent based on the total weight of resin solids of the composition. Other optional ingredients include water miscible materials, reactive diluents, co-solvents, coalescing aids, defoamers, plasticizers, associative thickeners, bactericides and the like.

FIG. 1 is one embodiment of the synthesis of a coating composition of the present invention. In this embodiment, the synthesis is illustrated as a three-step process. As illustrated, an isocyanate prepolymer is prepared in methyl ethyl ketone (MEK) from isophorone diisocyanate, dimethyl propionic acid, Terathane® 2000 (polytetramethylene glycol) and polyester. The isocyanate prepolymer may undergo chain extension with adipic acid dihyrdrazide and be dispersed in deionized water with dimethyl ethanol amine. The MEK may be vacuum stripped from the dispersion to form the product.

Electroconductive substrates, especially metal substrates such as steel, zinc, aluminum, copper, magnesium, or the like and galvanized metals such as any galvanized steels and the like whether hot dip galvanized or electrogalvanized or other galvanizing method can be coated with the compositions of the present invention. It is customary to pretreat the substrate with a phosphate conversion coating, usually a zinc phosphate conversion coating, followed by a rinse that seals the conversion coating. Pretreatments are well known to those skilled in the art. Examples of suitable pretreatment compositions are disclosed in U.S. Pat. Nos. 4,793,867 and 5,588,989, which are incorporated herein by reference in their entirety.

In one embodiment, the coating composition of the present invention can be deposited upon a substrate or over an existing coating by nonelectrophoretic means such as spray application.

It is contemplated that depending upon the desired application and use the coating compositions of the present invention may be incorporated into any liquid coating composition, powder coating composition, or aqueous slurry coating composition. As described herein below, the percent solids of the coating composition and the thickness of the coating composition as applied to the substrate can vary based upon such factors as the particular type of coating that is formed from the coating composition of the present invention, i.e. whether the coating composition is used in a primer surfacer, basecoat, clearcoat, topcoat, or combinations thereof, or monocoat composition; and the type of substrate and intended end use of the substrate.

In addition, it is contemplated that the coating composition of the present invention may be used to form a multilayer composite coating for application over a substrate including any of the previously mentioned substrates. For example, in one embodiment of the present invention, the present invention may be a multilayer composite coating comprising a primer deposited from a primer coating composition and a topcoat applied over at least a portion of the primer, wherein at least one of the primer composition and the topcoat composition comprise the coating composition of the present invention. In another embodiment, the present invention is directed to a multilayer composite coating comprising a basecoat deposited from a pigmented coating composition and a clearcoat applied over at least a portion of the basecoat, the clearcoat being deposited from a clearcoating composition, wherein at least one of the basecoat composition and the clearcoating composition comprise the coating composition of the present invention.

The composition of the present invention may be applied onto the surface of the substrate or over a previously formed polymeric underlayer by any suitable coating process known to those of ordinary skill in the art, for example, by dip coating, direct roll coating, reverse roll coating, curtain coating, spray coating, brush coating, electrostatic spray coating, and combinations thereof. The method and apparatus for applying the coating composition to the substrate is determined in part by the configuration and type of substrate material. In this regard, the coatings of the present invention may be applied over either metal or plastic substrates by these application methods. When applied over a plastic substrate, the compositions of the present invention are at least partially cured at a temperature below the thermal deformation temperature of the plastics.

For example, the coating composition employed in a primer/topcoat composite may be applied in a wet-on-wet application. In this example, the coating-composition may be incorporated into one or both of the primer and topcoat layers. The following example is provided by way of illustration only, as one of ordinary skill in the art will recognize that the coating composition may, but need not, be applied in a wet-on-wet application, and that other coatings, such as powder coatings, and coating methods may also be employed.

A substantially uncured coating of the primer coating composition is formed on the surface of the substrate during application of the primer coating composition to the substrate. In a particular embodiment, the surface of the substrate is pretreated as discussed above and electrocoated with 20 to 50 microns of electrodeposition coating, which is commercially available from PPG Industries, Inc. Other suitable electrodepositable coatings include those disclosed in U.S. Pat. Nos. 4,891,111, 4,933,056 and 5,760,107, which are hereby incorporated by reference in their entirety.

The primer composition can be a waterborne coating composition or a solventborne coating composition. In an embodiment of the present invention, the primer composition comprises a waterborne composition. The primer coating composition may contain the coating composition of the present invention or may be a conventional primer coating composition as described, for example, in U.S. Pat. Nos. 5,126,393; 5,280,067; 5,297,665; 5,589,228; and 5,905,132, which are incorporated herein by reference in their entirety. When the primer composition contains the coating composition of the present invention, the percent solids of the coating composition of the present invention in the primer composition may range from 5 to 100 percent, and in some embodiments may range from 15 to 100 percent by weight based on total weight of the resin solids of the primer composition.

The primer composition can be applied to the surface of the substrate by any suitable coating process known to those of ordinary skill in the art, for example, by dip coating, direct roll coating, reverse roll coating, curtain coating, spray coating, brush coating, electrostatic spray coating, and combinations thereof. The primer coating can, but need not, be cured before topcoating or dehydrated, as discussed below.

A substantially uncured primer coating is formed during application of the primer. As used herein, "substantially uncured" coating means that the coating composition, after application to the surface of the substrate, forms a film or coating that is substantially uncrosslinked, i.e., is not heated to a temperature sufficient to induce significant crosslinking and there is substantially no chemical reaction between the thermosettable dispersion and the crosslinking material.

During application of the primer coating composition to the substrate, ambient relative humidity generally can range from 30 to 90 percent, and in some embodiments can range from 60 percent to 80 percent.

After application of the primer coating composition, typically in aqueous form, to the substrate, the primer coating can be at least partially dried by evaporating water and solvent (if present) from the surface of the film by air drying at ambient (about 25° C.) or an elevated temperature for a period sufficient to dry the film but not significantly crosslink the components of the primer coating, if applicable. The heating can be for a short period of time sufficient to ensure that a topcoat composition can be applied over the primer coating essentially without dissolving the primer coating. Suitable drying conditions will depend on the components of the primer coating and on the ambient humidity, but in general a drying time of 1 to 5 minutes at a temperature of 80° F. to 250° F. (20° C. to 121° C.) will be adequate to ensure that mixing of the primer coating and the topcoat composition is minimized. The drying temperature can range from 20° C. to 120° C., and typically ranges from 70° C. to 90° C. Also, multiple primer coating compositions can be applied to develop the optimum appearance if desired. Usually between coats, the previously applied coat is "flashed"; that is, exposed to ambient conditions for 1 to 20 minutes.

Typically, the coating thickness of the primer coating after final drying and curing of the multilayer composite coating ranges from 0.4 to 2 mils (10 to 50 micrometers), and can range from 1.0 to 1.5 mils (25 to 38 micrometers).

A topcoat composition may be applied to at least a portion of a surface of the primer coating, and in some embodiments may be applied in a wet-on-wet application without substantially curing the primer coating. The topcoat composition may contain the coating composition of the present invention or may be a conventional topcoat coating composition as described, for example, in U.S. Pat. Nos. 4,403,003; 4,978,708; 5,071,904; 5,368,944; 5,739,194; 5,667,847 and 6,093,497, which are incorporated herein by reference in their entirety. Other suitable compositions are those formulations commercially available from PPG Industries, Inc. under the tradenames HWB and DWB. When the topcoat composition contains the coating composition of the present invention, the percent solids of the coating composition of the present invention may range from 5 to 100 percent, and may range from 15 to 100 percent by weight based on total weight of the resin solids of the topcoat composition.

The topcoat composition can be a waterborne coating or solventborne coating for wet-on-wet application. The topcoat may be a monocoat or a system incorporating a basecoat plus clearcoat.

The following example illustrates the coating composition employed in a basecoat/clearcoat composite in a wet-on-wet application. As discussed above, the following example is provided by way of illustration only, as one of ordinary skill in the art will recognize that the coating composition of the present invention may, but need not, be applied in a wet-on-wet application, and that other coatings, such as powder coatings, and coating methods may be employed.

A substantially uncured coating of the basecoat composition is formed on the substrate during application of the basecoat composition. The basecoat composition may contain the coating composition of the present invention or may be a conventional basecoat composition as described herein. When the basecoat composition contains the coating composition of the present invention, the percent solids of the coating composition may range from 5 to 100 percent, and may range from 40 to 80 percent by weight based on the total weight of the resin solids of the basecoat composition. Typically, the basecoat composition is a crosslinkable coating comprising at least one thermosettable film-forming material and at least one crosslinking material, although thermoplastic film-forming materials can be used. Suitable basecoats that may be employed in the present invention are those disclosed in U.S. Pat. No. 5,071,904, which is incorporated herein by reference in its entirety.

Suitable resinous binders for organic solvent-based basecoats are disclosed in U.S. Pat. No. 4,220,679 at column 2, line 24 through column 4, line 40 and U.S. Pat. No. 5,196,485 at column 11, line 7 through column 13, line 22. Suitable waterborne base coats for color-plus-clear composites are disclosed in U.S. Pat. No. 4,403,003, and the resinous compositions used in preparing those base coats can be used in the present invention. Also, waterborne polyurethanes such as those prepared in accordance with U.S. Pat. No. 4,147,679 can be used as the resinous binder in the basecoat. Further, waterborne coatings such as those described in U.S. Pat. No. 5,071,904 can be used as the basecoat. Each of the patents discussed above is incorporated by reference herein in their entirety. Other components of the basecoat composition can include crosslinking materials and additional ingredients such as pigments discussed above. Useful metallic pigments include aluminum flake, bronze flakes, coated mica, nickel flakes, tin flakes, silver flakes, copper flakes and combinations thereof. Other suitable pigments include mica, iron oxides, lead oxides, carbon black, titanium dioxide and talc. The specific pigment to binder ratio can vary widely so long as it provides the requisite hiding at the desired film thickness and application solids.

The basecoat composition may be applied to the surface of the substrate by any suitable coating process known to those of ordinary skill in the art, such as those described herein. During application of the basecoat composition to the substrate, ambient relative humidity generally can range from 30 to 90 percent, and in some embodiments may range from 60 percent to 80 percent.

A substantially uncured basecoat is formed during application of the basecoat. Typically, the basecoating thickness after curing of the substrate having the multilayered composite coating thereon ranges from 0.2 to 2.0 mils (10 to 50 micrometers), and in some embodiments may range from 0.5 to 1.2 mils (12 to 30 micrometers). Some migration of coating materials between the coating layers, for example less than 20 weight percent, can occur.

After application of the basecoat composition to the substrate, the basecoat can be at least partially dried by evaporating water and/or solvent from the surface of the film by air drying at ambient (about 25° C.) or an elevated temperature for a period sufficient to dry the film but not significantly crosslink the components of the basecoat composition. The heating can be only for a short period of time sufficient to ensure that a clear coating composition can be applied over the basecoat coating essentially without dissolving the basecoat coating. Suitable drying conditions depend on the components of the basecoat composition and on the ambient humidity, but generally the drying conditions are similar to those discussed above with respect to the primer coating. Also, multiple basecoat coating compositions can be applied to develop the optimum appearance. Usually between coats, the previously applied coat is flashed; that is, exposed to ambient conditions for 1 to 20 minutes.

A clear coating composition is then applied to at least a portion of the basecoat without substantially curing the basecoat coating to form a substantially uncured basecoat/clearcoat composite coating thereon. When the clear coating composition contains the coating composition of the present invention, the percent solids of the polyurethane in the clear coating composition may range from 5 to 100 percent, and in some embodiments may range from 15 to 100 percent by weight. The clear coating composition can be applied to the surface of the basecoat coating by any of the coating processes discussed above for applying the basecoat composition.

The clearcoat composition can be a waterborne coating or solventborne coating, typically in a wet-on-wet application, as desired. Where the clearcoat composition contains the coating composition of the present invention, the clearcoat composition is typically a waterborne coating. Typically the clear coating composition is a crosslinkable coating comprising at least one thermosettable film-forming material and at least one crosslinking material, although thermoplastic film-forming materials can be used. Suitable conventional waterborne clearcoats are disclosed in U.S. Pat. No. 5,098,947, incorporated herein by reference in its entirety, and are based on water soluble acrylic resins. Useful solventborne clearcoats are disclosed in U.S. Pat. Nos. 5,196,485 and 5,814,410, incorporated herein by reference in their entirety, and include polyepoxides and polyacid curing agents. Suitable conventional powder clearcoats are described in U.S. Pat. No. 5,663,240, incorporated herein by reference in their entirety, and include epoxy functional acrylic copolymers and polycarboxylic acid crosslinking agents. The clear coating composition can include crosslinking materials and any of the appropriate additional ingredients such as are discussed herein.

During application of the clear coating composition to the substrate, ambient relative humidity generally can range from 30 to 90 percent, and in some embodiments may range from 60 percent to 80 percent.

After application of the clear coating composition to the substrate, the composite coating can be at least partially dried by evaporating water and/or solvent from the surface of the film by air drying at ambient (about 25° C.) or an elevated temperature for a period sufficient to dry the film. Preferably, the clear coating composition is dried at a temperature and time sufficient to crosslink the crosslinkable components of the composite coating. Suitable drying conditions depend on the components of the clear coating composition and on the ambient humidity. Also, multiple clear coating compositions can be applied to develop the optimum appearance, if desired. Usually between coats, the previously applied coat is flashed; that is, exposed to ambient conditions for 1 to 20 minutes.

A substantially uncured multilayer coating of the clearcoat/basecoat composite or the topcoat/primer composite is formed on the surface of the substrate during application. Typically, the coating thickness after curing of the multilayered composite coating on the substrate may range from 0.5 to 4 mils (15 to 100 micrometers), and in some embodiments may range from 1.2 to 3 mils (30 to 75 micrometers).

After application of the clearcoating or topcoating composition, the composite coating coated substrate is heated to cure the coating films or layers. In the curing operation, water and/or solvents are evaporated from the surface of the composite coating and the film-forming materials of the coating films are crosslinked. The heating or curing operation is usually carried out at a temperature in the range of from 160° F. to 350° F. (71° C. to 177° C.) but if needed, lower or higher temperatures can be used as necessary to activate crosslinking mechanisms. The thickness of the dried and crosslinked composite coating is generally 0.2 to 5 mils (5 to 125 micrometers), and may range from 0.4 to 3 mils (10 to 75 micrometers).

In one embodiment, compositions including the coating composition of the present invention may be applied to by electrodeposition. In this embodiment, the materials and amounts utilized, and the process conditions employed may include those described in U.S. Pat. Nos. 6,602,974 and 6,624,276, which are incorporated herein by reference in their entirety.

Figure 3:
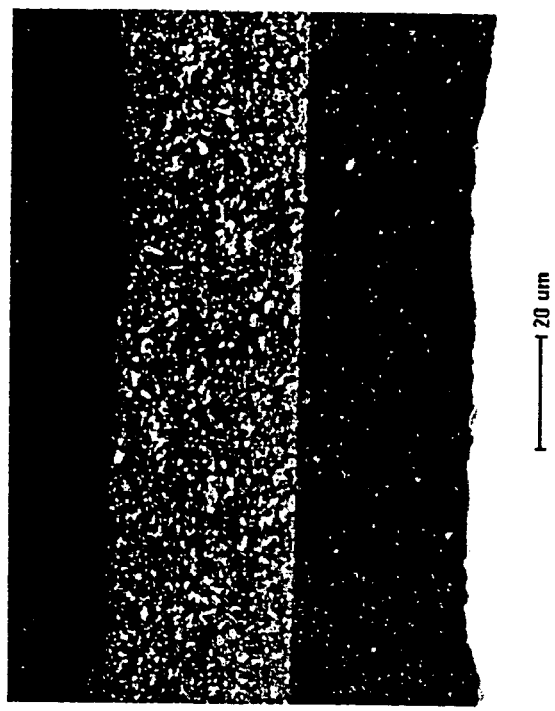
FIG. 3 is a photomicrograph from a scanning electron microscope at 1010× showing a cross section of a conventional coating.
Figure 2:
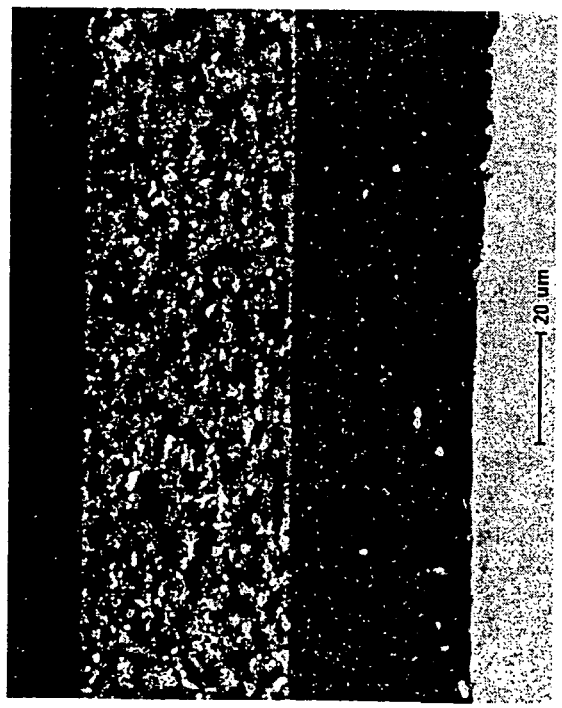
FIG. 2 is a photomicrograph from a scanning electron microscope at 1010× showing a cross section of a coating of the present invention.

FIG. 2 is a photomicrograph taken using a scanning electron microscope at 1010× of a cross section of a coating of the present invention, which clearly shows the bicontinuous morphology of the coating (dark and light portions representing different phases). FIG. 3 is a photomicrograph taken using a scanning electron microscope at 1010× of a cross section of a prior art coating, which is homogenous.

Coatings including the coating compositions of the present invention can provide primer surfacer, basecoat, clearcoat, and monocoat coatings having one or more desirable properties, such as improved chip resistance. Although not intending to be bound be any particular theory, it is believed that the mechanism and compositional effects that lead to a bicontinuous phase morphology provides these improved properties.

The invention will be further described by reference to the following examples. The following examples are merely illustrative of the invention and are not intended to be limiting. Unless otherwise indicated, all parts are by weight.

EXAMPLES

Example 1

Waterbased Polyurethane (WR-43-4942; VK-93)

This example illustrates the preparation of a high molecular weight polyurethane.

Isocyanate Prepolymer

A reaction vessel equipped with stirrer, thermocouple, condenser and nitrogen inlet was charged with 1010.3 g TERATHANE® 2000 and 50.7 g dimethylolpropionic acid and heated to 60° C. 336.7 g isophorone diisocyanate was added over 10 minutes followed by 356.2 g methyl ethyl ketone and 1.51 g dibutyltin dilaurate. The reaction exothermed to 63° C. The reaction temperature was raised to 80° C. and the contents were stirred until the isocyanate equivalent weight was 1380. Then 39.4 g dimethylolpropionic acid was added to the reaction flask. The contents were stirred until the isocyanate equivalent weight was 2094.

The resultant product had a solids content of 83.4 weight percent (measured for one hour at 110° C.), an acid value of 21.20 mg KOH/g and a weight average molecular weight of 14971 in THF.

Dispersion and Vacuum Distillation 1552.0 g of the above prepolymer at 76° C. was added over 25 minutes to a solution of 2259.9 g deionized water, 40.6 g adipic acid dihydrazide and 52.2 g dimethyl ethanol amine stirring at 21° C. and at 500 rpm in a cylindrical gallon reaction flask equipped with baffles, double pitched bladed stirrer, thermocouple and condenser. The dispersion temperature after this addition was 36° C. The reaction contents were stirred until no evidence of isocyanate was observed by FTIR.

This dispersion was transferred to a flask equipped with a stirrer, thermocouple, condenser and a receiver. The dispersion was heated to 60° C. and methyl ethyl ketone and water were removed by vacuum distillation.

The final dispersion has a solids content of 38.7 weight percent (measured for one hour at 110° C.), a Brookfield viscosity of 144 centipoise using a #2 spindle at 60 rpm, an acid content of 0.171 meq acid/g, a base content of 0.177 meq base/g, a pH of 8.26, a residual methyl ethyl ketone content of 0.15 weight percent and a weight average molecular weight of 95536 in DMF.

Example 2

Polyester Intermediate (1,6-hexanediol isophthalate)

This example illustrates the preparation of a polyester intermediate for a waterbased polyurethane.

A reaction vessel equipped with stirrer, thermocouple, glycol recovery set-up, condenser and nitrogen inlet was charged with 1994.4 g isophthalic acid, 1770.0 g 1,6-hexanediol and 1.9 g dibutyltin oxide and heated to 220° C. Water was removed until the reaction's acid value was 5.82 mg KOH/g. Then the glycol recovery set-up was replaced with a Dean-Stark trap, 75.3 g xylene was added and water was azeotropically removed until the acid value was 0.18 mg KOH/g. The reaction contents were cooled to 160° C. and xylene was removed by vacuum distillation. The final product had a solids content of 97.48 weight percent (measured for one hour at 110° C.), an acid value of 0.16 mg KOH/g, a hydroxyl value of 90.3 mg KOH/g and water content of 0.34 percent.

Example 3

Waterbased Polyurethane (WR-78-3394)

This example illustrates the preparation of a high molecular weight polyurethane containing polyester intermediate.

Isocyanate Prepolymer

A reaction vessel equipped with stirrer, thermocouple, condenser and nitrogen inlet was charged with 1362.0 g TERATHANE® 2000, 280.4 g of the product of Example 2, 91.2 g dimethylolpropionic acid, 605.6 g isophorone diisocyanate, 580.0 g methyl ethyl ketone and heated to 60° C. Then 2.72 g dibutyltin dilaurate was added. The reaction exothermed to 78° C. The reaction temperature was raised to 80° C. and the contents were stirred until the isocyanate equivalent weight was 1286. Then 71.5 g dimethylolpropionic acid was added to the reaction flask. The contents were stirred until the isocyanate equivalent weight was 1882.6.

Dispersion and Vacuum Distillation 1392.0 g of the above prepolymer was added over 19 minutes to a solution of 2028.1 g deionized water, 61.8 g adipic acid dihydrazide and 50.4 g dimethyl ethanol amine stirring at 25° C. and at 510 rpm in a cylindrical gallon reaction flask equipped with baffles, double pitched bladed stirrer, thermocouple and condenser. The dispersion temperature after this addition was 41° C. The reaction contents were stirred until no evidence of isocyanate was observed by FTIR.

This dispersion was transferred to a flask equipped with a stirrer, thermocouple, condenser and a receiver. The dispersion was heated to 60° C. and methyl ethyl ketone and water were removed by vacuum distillation.

The final dispersion had a solids content of 39.81 weight percent (measured for one hour at 110° C.), a Brookfield viscosity of 240 centipoise using a #3 spindle at 60 rpm, an acid content of 0.203 meq acid/g, a base content of 0.200 meq base/g, a pH of 7.64 and a weight average molecular weight of 49148 in DMF.

Example 4

Coating compositions were prepared from a gray pigment paste, as follows:

TABLE 1

| Item No. | Component | Weight (g) |
| --- | --- | --- |
| 1 | Resydrol ® VAZ 6600[1] | 57.89 |
| 2 | Deionized Water | 1.72 |
| 3 | 50% solution of Dimethyl ethanol amine | 0.09 |
| 4 | Surfynol ® Dispersing Agent[2] | 1.18 |
| 5 | Additol ® Wetting Agent[3] | 2.33 |
| 6 | Drewplus ® Defoamer[4] | 1.93 |
| 7 | Carbon Black[5] | 3.48 |
| 8 | Aerosil ® Silica[6] | 1.15 |
| 9 | Talc | 3.85 |
| 10 | Titanium Dioxide | 7.33 |
| 11 | Barium Sulfate | 64.19 |
| 12 | Deionized Water | 3.46 |

[1] available from UCB Surface Specialties, Smyrna, Georgia
[2] available from Air Products and Chemicals, Inc. Allentown, Pennsylvania
[3] available from UCB Surface Specialties
[4] available from Ashland Specialty Chemical Company, Dublin, Ohio
[5] available from Degussa, Rotterdam, Netherlands
[6] available from Degussa Components 1-6 were stirred together in the given order. The pigment portions (7 through 11) were added in small portions with agitation until a smooth paste was formed. The paste was then recirculated for 20 minutes using an Eiger Minimill at 2500 rpm with 2 mm zircoa beads. The final product had a hegman of greater than 7.5.

Example 5

In this example, the paste prepared in Example 4 was used to form a coating composition with the addition of melamine but without the addition of a urethane component, and was tested for chip performance. The test results are set forth below. This coating composition was made by adding the following ingredients stepwise with agitation:

TABLE 2

| Item No. | Component | Weight (g) |
| --- | --- | --- |
| 1 | Paste from Example 4 | 148.60 |
| 2 | Resydrol ® VAZ 6600[7] | 150.44 |
| 3 | Maprenal ® MF 9048[8] | 25.00 |
| 4 | Mineral Spirits | 4.50 |
| 5 | M-pyrol | 7.70 |
| 6 | Byk wetting additives[9] | 6.84 |
| 7 | 50% solution of Dimethyl ethanol amine | 1.55 |
| 8 | Deionized Water | 35.40 |

[7] available from UCB Surface Specialties
[8] available from UCB Surface Specialties
[9] available from Byk-Chemie, Wesel, Germany (50/50 mixture of Byk 346 and Byk 381)

The pH of the coating was greater than 8.0. The viscosity was 30 seconds measured on a #4 Ford efflux cup at ambient temperature.

Example 6

The paste prepared in Example 4, with the addition of melamine and VK-93 (Example 1), was used to form one embodiment of the coating composition of the present invention, and tested for chip performance. Test results are set forth below. This coating composition was made by adding the following ingredients stepwise with agitation:

TABLE 3

| Item No. | Component | Weight (grams) |
| --- | --- | --- |
| 1 | Paste from Example 4 | 148.60 |
| 2 | Resydrol ® VAZ 6600[10] | 94.89 |
| 3 | Polyurethane resin (VK-93)[11] | 53.33 |
| 4 | Maprenal ® MF 904[12] | 25.00 |
| 5 | Mineral Spirits | 4.50 |
| 6 | M-pyrol | 7.70 |
| 7 | Byk wetting additives[13] | 6.84 |
| 8 | 50% solution of Dimethyl ethanol amine | 1.55 |
| 9 | Deionized Water | 16.50 |

[10] available from UCB Surface Specialties
[11] set forth in Example 1, herein
[12] available from UCB Surface Specialties
[13] available from Byk-Chemie, Wesel, Germany (50/50 mixture of Byk 346 and Byk 381)

The pH of the coating was greater than 8.0. The viscosity was 30 seconds measured on a #4 Ford efflux cup at ambient temperature.

Example 7

The paste prepared in Example 4 was used to form a coating composition with the addition of melamine and blocked NCO and tested for chip performance. Test results are set forth below. This coating composition was made by adding the following ingredients stepwise with agitation:

TABLE 4

| Item No. | Component | Weight (g) |
| --- | --- | --- |
| 1 | Paste from Example 4 | 148.60 |
| 2 | Resydrol ® VAZ 6600[14] | 150.44 |
| 3 | Trixene ® BL 7986[15] | 50.00 |
| 4 | Maprenal ® MF 904[16] | 25.00 |
| 5 | Mineral Spirits | 4.50 |
| 6 | M-pyrol | 7.70 |
| 7 | Byk wetting additives[17] | 6.84 |
| 8 | 50% solution of Dimethyl ethanol amine | 1.55 |
| 9 | Deionized Water | 73.00 |

[14] available from UCB Surface Specialties
[15] available from Baxenden Chemical Ltd., Droitwich, England
[16] available from UCB Surface Specialties
[17] available from Byk-Chemie (50/50 mixture of Byk 346 and Byk 381)

The pH of the coating was greater than 8.0. The viscosity was 30 seconds measured on a #4 Ford efflux cup at ambient temperature.

The three primer compositions in Examples 5-7 were tested and their gloss and chip properties were compared to each other. The test substrate was ACT galvanneal panels. These panels were electrocoated with a cationically electrodepositable primer commercially available as ED6100H from PPG Industries, Inc., Pittsburgh Pa. The prepared panels are available from ACT Laboratories of Hillsdale, Mich.

The primer compositions were spray applied (2 coats automated spray with 60 second ambient flash between coats) at 60% relative humidity and 21° C. to give a dry film thickness of 1.20 to 1.40 mils. The panels were flashed for 5 minutes at ambient temperature, and dehydrated for 5 minutes at 80° C. and then cured for 17 minutes at 140° C. The panels were topcoated with CHWB303713, silver basecoat commercially available from PPG Industries, Inc., and flashed for 5 minutes at ambient conditions and dehydrated at 94° C. for 10 minutes to a dry film thickness of 0.55 to 0.66 mils. The panels were then clearcoated with NDCT5002 Clearcoat, commercially available from PPG Industries, Inc., and flashed for 10 minutes at ambient conditions and cured for 25 minutes at 140° C., to a dry film thickness of 1.8 mils.

The gloss of the prepared panels was measured using with an Autospec QMS-BP Unit with a high gloss sensor head available from Autospec, Inc. of Ann Arbor, Mich. Higher numbers indicate higher, more desirable gloss.

The chip resistance of the prepared panels was measured by a GM Gravelometer (GM test method GME 60-268, −20° C. with the exception that size 6 stone was used). Actual number of hits were counted and reported as hits to primer or hits to metal rather than using the standard GM rating scale. The diameter of the resulting hit was also measured and recorded.

The tests results are set forth below in Table 5.

TABLE 5

| Sample | Gloss | No. of Chip Hits |
| --- | --- | --- |
| Example 5 (without urethane) | 42.1 | 22 hits to metal 1 to 5 mm in diameter |
| Example 6 (with urethane) | 39.6 | 11 hits to primer <1 mm in diameter |
| Example 7 (with blocked NCO) | 49.3 | 9 hits to primer 1 hit 7 mm in diameter remainder of hits <2 mm in diameter |

As shown in Table 5, the substrate coated with the urethane containing material, as an embodiment of the present invention, exhibited much fewer and smaller damaging hits to the system. It also exhibited the preferred mode of failure of which the damage does not reach the substrate layer.

Example 8

Gray coating compositions were prepared and tested for chip resistance, as set forth below. All percentages are based on rein solids, pigment solids, and additive solids on total paste. The composition was prepared as follows:

676.73 g  Barytes paste comprising 14.81 percent VAZ-6600 urethane polyester resin, available from UCB Surface Specialties, 0.40 percent solution of Disperbyk ® 181 and Surfynol ® 104E grind additives (2.5:1 solids ratio), available from Byk-Chemie and Air Products and Chemicals, Inc., respectively, 44.46 percent Barytes, 0.88 percent Aerosil ® R972 silica, available from Degussa, Rotterdam, Netherlands, and the remainder being water.

| | |
|---|---|
| 180.70 g | Talc paste comprising 28.75 percent VAZ-6600 urethane polyester resin, 0.14 percent Disperbyk ® 181 and Surfynol ® 104E grind additives (1.6:1 solids ratio), 14.44 percent talc, and the remainder being water. |
| 271.30 g | TiO$_2$ paste comprising of 16.45 percent VAZ-6600 urethane polyester resin, 0.48 percent Disperbyk ® 181 and Surfynol ® 104E grind additives (2.5:1 solids ratio), 50.37 percent titanium dioxide, and the remainder being water. |
| 27.13 g | Carbon Black paste comprising of 30.00 percent VAZ-6600 urethane polyester resin, 0.13 percent Disperbyk ® 181 and Surfynol ® 104E grind additives (1.9:1 solids ratio), 12.00 percent carbon black, and the remainder being water. |
| 796.79 g | VAZ-6600 urethane polyester resin |
| 130.00 g | Resimene ® 745, available from UCB Surface Specialties |
| 19.50 g | Mineral Spirits |
| 52.00 g | N-methyl pyrrolidone |
| 12.15 g | Byk-Chemie 346 flow additive |
| 12.25 g | Byk-Chemie 381 leveling additive |
| 5.40 g | Dimethyl ethanol amine (50% solution) |
| 4.88 g | Drewplus ® L-108 defoamer from Ashland Chemicals |
| 220.22 g | Water |

The first four ingredients were prepared as individual pigment pastes and in the same manner as the pigment paste of Example 4. These four pastes were then stirred together. The remaining components were added to the sample under agitation in the order listed above. The pH of the resultant coating was greater than 8.0 and the viscosity was 30 seconds measured by a #4 Ford efflux cup at ambient temperature.

Example 9

Gray coating compositions of embodiments of the present invention were prepared and tested for chip resistance, as set forth below. All percentages are based on rein solids, pigment solids, and additive solids on total paste. The composition was prepared as follows:

The first four ingredients were prepared as individual pigment pastes and in the same manner as the pigment paste of Example 4. These four pastes were then stirred together. The remaining components were added to the sample under agitation in the order listed above. The pH of the resultant coating was greater than 8.0 and the viscosity was 30 seconds measured by a #4 Ford efflux cup at ambient temperature.

The primer composition of the present invention set forth in Example 9 was compared to the composition set forth in Example 8 and a solventborne primer, NPX 2622 Silver Primer available from PPG Industries, Inc. Two different test substrates were employed. The first test substrate employed was ACT galvanneal panels. These panels are available from ACT Laboratories of Hillsdale, Mich. These panels were

| | |
|---|---|
| 676.73 g | Barytes paste comprising 14.81 percent VAZ-6600 urethane polyester resin, available from UCB Surface Specialties, 0.40 percent solution of Disperbyk ® 181 and Surfynol ® 104E grind additives (2.5:1 solids ratio), available from Byk-Chemie and Air Products and Chemicals, Inc., respectively, 44.46 percent Barytes 0.88 percent Aerosil ® R972 silica, available from Degussa, Rotterdam, Netherlands, and the remainder being water. |
| 180.70 g | Talc paste comprising of 28.75 percent VAZ-6600 urethane polyester resin, 0.14 percent Disperbyk ® 181 and Surfynol ® 104E grind additives (1.6:1 solids ratio), 14.44 percent talc, and the remainder being water. |
| 271.30 g | TiO$_2$ paste comprising of 16.45 percent VAZ-6600 urethane polyester resin, 0.48 percent Disperbyk ® 181 and Surfynol ® 104E grind additives (2.5:1 solids ratio), 50.37 percent titanium dioxide, and the remainder being water. |
| 27.13 g | Carbon Black paste comprising 30.00 percent VAZ-6600 urethane polyester resin, 0.13 percent Disperbyk ® 181 and Surfynol ® 104E grind additives (1.9:1 solids ratio), 12.00 percent carbon black, and the remainder being water. |
| 435.68 g | VAZ-6600 urethane polyester resin |
| 333.33 g | Polyurethane resin (WR-78) of Example 3 |
| 130.00 g | Resimene ® 745, available from UCB Surface Specialties |
| 19.50 g | Mineral Spirits |
| 52.00 g | N-methyl pyrrolidone |
| 12.15 g | Byk-Chemie 346 flow additive |
| 12.25 g | Byk-Chemie 381 leveling additive |
| 5.40 g | Dimethyl ethanol amine (50% solution) |
| 4.88 g | Drewplus ® L-108 defoamer from Ashland Chemicals |
| 220.22 g | Water | electrocoated with a cationically electrodepositable primer, available from PPG Industries, Inc. as ED6450HE. These panels were electrocoated at the PPG Industries, Inc. Cleveland, Ohio facility. The second test substrate employed was a galvanneal substrate coated with NPX 2622, prepared and supplied by Nissan Motor Co., Ltd., Smyrna, Ga. The second test substrate were also electrocoated with ED6450HE.

The primer compositions of Examples 8 and 9, as well as the solventborne primer sample, were spray applied (2 coats automated spray with 60 second ambient flash between coats) at 60% relative humidity and 21° C. to give a dry film thickness of 1.20 to 1.40 mils. The waterborne composition sprayed on panels were flashed for 5 minutes at ambient temperature, and dehydrated for 5 minutes at 80° C. and then cured for 17 minutes at 140° C. A second set of panels was flashed 5 minutes at ambient temperature, and dehydrated 5 minutes at 80° C. and cured 25 minutes at 152° C. to simulate an overbake scenario. The solventborne composition sprayed on panels was flashed for 10 minutes at ambient temperature and then cured at 25 minutes at 152° C.

The panels were topcoated with CHWB303713 silver basecoat commercially available from PPG Industries, Inc., and flashed for 5 minutes at ambient conditions and dehydrated at 94° C. for 10 minutes to a dry film thickness of 0.55 to 0.66 mils.

The panels were then clearcoated with NDCT5002 Clearcoat commercially available from PPG Industries, Inc., and flashed for 10 minutes at ambient conditions and cured for 25 minutes at 140° C., to a dry film thickness of 1.8 mils.

The gloss of the prepared panels was then measured using the following test: Gloss was measured with a micro-tri-gloss meter available from Byk-Gardner, Columbia, Md. Higher numbers indicate higher, more desirable gloss.

The chip of the prepared panels was also measured using the CHIP TEST METHOD (i.e. chip resistance (multichip) by the Nissan Specification No. KAG-P-00065 using brass nuts, −20° C.). A rating was used in accordance with the Nissan Specification, with lower rating numbers exhibiting better chip performance.

The tests results are set forth below in Table 6.

TABLE 6

| Sample | Bake Condition | Chip Rating Substrate 1[17] | Chip Rating Substrate 2[18] | 60° Gloss |
|---|---|---|---|---|
| Ex. 8 | 17' at 285° C. | 8 | 8 | 92.5 |
| (without PU) | 25' at 305° C. | 8 | 8 | 91.0 |
| Ex. 9 | 17' at 285° C. | 6 | 6 | 82.0 |
| (with PU) | 25' at 305° C. | 6 | 7 | 75.5 |
| NPX 2622 (S/B) | 25' @ 305° C. | 8 | 8 | 93.0 |

PU = polyurethane
S/B = solventborne
[17]Substrate 1: Substrate supplied by Nissan Motor Co., Ltd.
[18]Substrate 2: Substrate purchased from ACT As illustrated, the multilayer composite coating of the present invention may have a maximum chip resistance rating of 7 as tested in accordance with the CHIP TEST METHOD.

Test results of the resins of the present invention indicate that there is an apparently strong correlation between the difference in the solubility parameter and surface tensions with chip resistance and appearance. It was observed that when the difference in solubility parameter and surface tension between the polyurethane and the polyester component increased, the chip resistance increased, whereas when the difference in solubility parameter and surface tension decreased, the appearance of the coating increased. Furthermore, there appears to be a trend in the difference in Tg of the polyurethane and polyester components with observed chip performance. It was also observed that resins exhibiting poor chip resistance have significantly higher bulk moduli when compared to those resins of the present invention exhibiting superior chip resistance. Accordingly, it is believed that the resin exhibiting the best appearance properties (and worst chip properties) will undergo brittle rather than ductile failure.

Tests results also have shown that from the empirical behavior of the resins and their measured properties, chip resistance is believed to be driven by a spinodal phase separation of polyurethane and polyester blocks and the crosslinker, if present, each of which having intrinsic differences bulk properties (Tg, shear yield stress, brittle fracture stress, and bulk modulus). The resulting morphology may exhibit reduced appearance due to the surface tension gradients created by the phase separation.

It is believed that by balancing the appearance and improved chip resistance, a resin system having optimum properties could be obtained. These properties include: small differences in the surface tensions of the polyurethane, polyester, and crosslinker components, if present; a selection of resins possessing low shear yield stress (relative to brittle fracture stress) at high deformation rates (low temperatures); and differences in the free energy of mixing of the polyurethane, polyester, and crosslinker components, if available, that will afford spinodal phase separation under cure conditions. The difference of free energy of mixing may be achieved, for example, through modification of Mw or the solubility parameter, or a combination thereof.

Because it has been observed that the solubility parameter and the surface tension properties are strongly related and there is an inverse correlation between these properties, the present invention may allow for quick screening of film forming compositions having, for example, polyurethane and polyester components with various crosslinking agents to more effectively develop a composition with acceptable appearance with enhanced chip resistance properties.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

We claim:

1. A coating composition, comprising:
   (a) a film-forming component comprising a functional group-containing resinous binder that comprises (1) a polyurethane component wherein the polyurethane component is formed from the reaction of at least one polyisocyanate, at least one acid functional material or anhydride having at least one functional group reactive with isocyanate or hydroxyl groups of other components from which the polyurethane component is formed, and at least one active hydrogen containing material, wherein the residue of the active hydrogen containing material is a polyether group that is incorporated into the backbone of the polyurethane component; and (2) an active hydrogen containing water dispersible polymer component; and wherein said polyurethane component comprises anionic ionizable groups; and
   (b) a crosslinking agent having at least two functional groups that are reactive with the functional groups of the film-forming component (a), wherein, when the composition is applied and cured to form a cured coating, the cured coating is characterized as having a bicontinuous morphology.

2. The coating composition of claim 1, wherein the polyurethane component is the reaction product of a polyester component with said polyisocyante, said acid functional material or anhydride, and said active hydrogen containing material.

3. A coating composition, comprising:
   a film-forming component comprising a functional group-containing resinous binder that comprises a polyurethane component wherein the polyurethane component is formed from the reaction of at least one polyisocyanate, at least one acid functional material or anhydride having at least one functional group reactive with isocyanate or hydroxyl groups of other components from which the polyurethane component is formed, and at least one active hydrogen containing material, wherein the residue of the active hydrogen containing material is a polyether group that is incorporated into the backbone of the polyurethane component; and wherein said polyurethane component comprises anionic ionizable groups; and
   wherein when the composition is applied and cured to form a cured coating, the cured coating is characterized as having a bicontinuous morphology.

4. The coating composition of claim 3, further comprising a crosslinking agent having at least two functional groups that are reactive with the functional groups of the film-forming component.

5. A multilayer composite coating comprising a primer coating deposited from a primer coating composition, and a topcoat applied over at least a portion of the primer coating wherein the topcoat is deposited from a topcoating composition, and wherein the primer coating composition comprises the coating composition of claim 3.

6. The multilayer composite coating of claim 5 having a maximum chip resistance rating of 7 as tested in accordance with CHIP TEST METHOD.

7. A coated substrate having coated layers applied thereover, at least one of the layers comprising the coating composition of claim 3.

8. A coating composition comprising a polymeric portion dispersed in a carrier, the polymeric portion being formed from components comprising:
   (a) a film-forming material comprised of a functional group-containing resinous binder formed from a polyurethane component wherein the polyurethane component is formed from the reaction of at least one polyisocyanate, at least one acid functional material or anhydride having at least one functional group reactive with isocyanate or hydroxyl groups of other components from which the polyurethane component is formed, and at least one active hydrogen containing material, wherein the residue of the active hydrogen containing material is a polyether group that is incorporated into the backbone of the polyurethane component; and wherein said polyurethane component comprises anionic ionizable groups; and
   (b) a crosslinking agent having at least two functional groups that are reactive with the functional groups in the film-forming material (a), wherein, when the composition is applied and cured to form a cured coating, said coating is characterized as having a bicontinuous morphology.

9. The coating composition of claim 8, wherein the carrier comprises an aqueous composition.

10. The coating composition of claim 9, wherein the carrier comprises an organic solvent.

11. A coating composition comprising a polymeric portion dispersed in a carrier, the polymeric portion being formed from components comprising:
   (a) a film-forming material comprised of a functional group-containing resinous binder formed from a polyurethane component and a water dispersible polymer component, wherein the polyurethane component is formed from the reaction of at least one polyisocyanate, at least one acid functional material or anhydride having at least one functional group reactive with isocyanate or hydroxyl groups of other components from which the polyurethane component is formed, and at least one active hydrogen containing material, wherein the residue of the active hydrogen containing material is a polyether group that is incorporated into the backbone of the polyurethane component; and wherein said polyurethane component comprises anionic ionizable groups; and
   wherein, when the composition is applied and cured to form a cured coating, the coating is characterized as having a bicontinuous morphology.

12. The coating composition of claim 11, further comprising a crosslinking agent having at least two functional groups that are reactive with the functional groups in the film-forming material (a).

13. A coating composition, comprising:
   (a) a film-forming component comprising a functional group-containing resinous binder that comprises a polyurethane component wherein the polyurethane component is formed from the reaction of at least one polyisocyanate, at least one acid functional material or anhydride having at least one functional group reactive with isocyanate or hydroxyl groups of other components from which the polyurethane component is formed, and at least one active hydrogen containing material, wherein the residue of the active hydrogen containing material is a polyether group that is incorporated into the backbone of the polyurethane component; and wherein said polyurethane component comprises anionic ionizable groups; and
   (b) a crosslinking agent having at least two functional groups that are reactive with the functional groups of the film-forming component (a), wherein, when the composition is applied and cured to form a cured coating, the cured coating is characterized as having a bicontinuous morphology.

14. The coating composition of claim 13, wherein the coating composition comprises an aqueous composition.

15. The coating composition of claim 13, wherein the film-forming component further comprises a water dispersible polymer component, copolymers of the polyurethane component and the water dispersible polymer component, or mixtures thereof.

16. The coating composition of claim 15, wherein the water dispersible polymer component is present in an amount ranging from 30 to 80 weight percent based upon the total resin solids of components from which the coating composition is formed.

17. The coating composition of claim 15, wherein the water dispersible polymer component is present in an amount ranging from 50 to 70 weight percent based upon the total resin solids of components from which the coating composition is formed.

18. The coating composition of claim 15, wherein the water dispersible polymer component has a weight average molecular weight ranging from 2,000 to 20,000 grams per mole.

19. The coating composition of claim 18, wherein the water dispersible polymer component has a weight average molecular weight ranging from 4,000 to 12,000 grams per mole.

20. The coating composition of claim 15, wherein the miscibility of the polyurethane component with the water dispersible polymer component is such that an interaction parameter, chi ($\chi$), is at least 0.5.

21. The coating composition of claim 15, wherein the miscibility of the polyurethane component with the water dispersible polymer component is such that the difference between the solubility parameter, $\delta_a$, of the polyurethane component and the solubility parameter, $\delta_b$, of the water dispersible polymer component $(\delta_a-\delta_b)$ is at least 1.

22. The coating composition of claim 15, wherein the miscibility of the polyurethane component with the water dispersible polymer component is such that the difference between the solubility parameter, $\delta_a$, of the polyurethane component and the solubility parameter, $\delta_b$, of the water dispersible polymer component $(\delta_a-\delta_b)$ is at least 1.5.

23. The coating composition of claim 15, wherein the miscibility of the polyurethane component with the water dispersible polymer component is such that the difference between the solubility parameter, $\delta_a$, of the polyurethane component and the solubility parameter, $\delta_b$, of the water dispersible polymer component $(\delta_a-\delta_b)$ is between 1.5 and 2.

24. The coating composition of claim 15, wherein the miscibility of the polyurethane component with the water dispersible polymer component is characterized by the difference between the solubility parameter, $\delta_a$, of the polyurethane component and the solubility parameter, $\delta_b$, of the water dispersible polymer component $(\delta_a-\delta_b)$ is at least 2.

25. The coating composition of claim 13, wherein the polyurethane component is present in the coating composition in an amount ranging from 5 to 40 percent by weight based upon the total weight of the coating composition.

26. The coating composition of claim 25, wherein the polyurethane component is present in the coating composition in an amount ranging from 5 to 30 percent by weight based upon the total weight of the coating composition.

27. The coating composition of claim 13, wherein the polyurethane component is formed from a polyisocyanate selected from the group consisting of aliphatic polyisocyanates, cycloaliphatic polyisocyanates, araliphatic polyisocyanate, and aromatic polyisocyanates, and mixtures thereof.

28. The coating composition of claim 27, wherein the polyisocyanate is selected from the group consisting of isophorone diisocyanate, tetramethyl xylylene diisocyanate, trimethyihexamethylene diisocyanate, hexamethylene diisocyanate, and mixtures thereof.

29. The coating composition of claim 28, wherein the polyisocyanate comprises isophorone diisocyanate.

30. The coating composition of claim 27, wherein the polyisocyanate is present in an amount ranging from 15 to 50 weight percent based upon the total resin solids of components from which the polyurethane component is formed.

31. The coating composition of claim 30, wherein the polyisocyanate is present in an amount ranging from 20 to 35 weight percent based upon the total resin solids of components from which the polyurethane component is formed.

32. The coating composition of claim 13, wherein the acid functional material comprises an acid functional carboxylic acid.

33. The coating composition of claim 13, wherein the acid functional material is present in an amount ranging from 1 to 20 weight percent based on the resin solids of components from which the polyurethane component is formed.

34. The coating composition of claim 33, wherein the acid functional material is present in an amount ranging from 6 to 10 weight percent based on the resin solids of components from which the polyurethane component is formed.

35. The coating composition of claim 13, wherein the active hydrogen containing material comprises at least one polyether polyol.

36. The coating composition of claim 35, wherein the polyether polyol is selected from the group consisting of poly(oxytetramethylene) glycol, polypropylene, and alkoxylated Bisphenol A, and mixtures thereof 37. The coating composition of claim 36, wherein the polyether polyol comprises poly(oxytetramethylene) glycol.

38. The coating composition of claim 35, wherein the polyether polyol is present in an amount ranging from up to 70 weight percent based upon the total resin solids of components from which the polyurethane component is formed.

39. The coating composition of claim 38, wherein the polyether polyol is present in an amount ranging from 30 to 70 weight percent based upon the total resin solids of components from which the polyurethane component is formed.

40. The coating composition of claim 13, wherein the polyurethane component has a weight average molecular weight ranging from 10,000 to 100,000 grams per mole.

41. The coating composition of claim 40, wherein the polyurethane component has a weight average molecular weight ranging from 30,000 to 90,000 grams per mole.

42. The coating composition of claim 41, wherein the polyurethane component has a weight average molecular weight ranging from 40,000 to 60,000 grams per mole.

43. The coating composition of claim 13, wherein the crosslinking agent is selected from the group consisting of an aminoplast resin, a polyisocyanate, and mixtures thereof.

44. The coating composition of claim 43, wherein the crosslinking agent comprises at least one aminoplast resin.

45. The coating composition of claim 13, wherein the crosslinking agent is present in an amount ranging from 10 to 40 weight percent based upon the total resin solids of components from which the coating composition is formed.

46. The coating composition of claim 45, wherein the crosslinking agent is present in an amount ranging from 14 to 30 weight percent based upon the total resin solids of components from which the coating composition is formed.

47. The coating composition of claim 13, wherein the components from which the film-forming component (a) is formed further comprise a chain extender.

48. The coating composition of claim 47, wherein the chain extender comprises a diamine.

49. The coating composition of claim 48, wherein the diamine component is selected from the group consisting of 1,2-ethylene diamine, 1,2-porphylene diamine, 1,8-octane diamine, isophorone diamine, propane-2,2-cyclohexyl amine, phenylene diamine and toluene diamine, and mixtures thereof.

50. The coating composition of claim 47, wherein the chain extender is present in an amount ranging from 1 to 8 weight percent based upon the total resin solids of components from which the film-forming component (a) is formed.

51. A multilayer composite coating comprising a primer coating deposited from a primer coating composition, and a topcoat applied over at least a portion of the primer coating wherein the topcoat is deposited from a topcoating composition, and wherein the primer coating composition comprises the coating composition of claim 13.

52. The multilayer composite coating of claim 51 having a maximum chip resistance rating of 7 as tested in accordance with CHIP TEST METHOD.

53. A coated substrate having coated layers applied thereover, at least one of the layers comprising the coating composition of claim 13.

54. The coating composition of claim 13, wherein the polyurethane component is the reaction product of a polyester component with said polyisocyante, said acid functional material or anhydride, and said active hydrogen containing material.

* * * * *